United States Patent
Song et al.

(10) Patent No.: US 8,229,089 B2
(45) Date of Patent: Jul. 24, 2012

(54) METHOD AND APPARATUS FOR CONTROLLING OUTPUT LEVEL OF VOICE SIGNAL DURING VIDEO TELEPHONY

(75) Inventors: Hee-Jun Song, Namyangju-si (KR); Je-Han Yoon, Seongnam-si (KY); Hyun-Sik Shim, Yongin-si (KR); Young-Hee Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 12/802,427

(22) Filed: Jun. 7, 2010

(65) Prior Publication Data

US 2010/0315485 A1 Dec. 16, 2010

(30) Foreign Application Priority Data

Jun. 5, 2009 (KR) .................. 10-2009-0050011

(51) Int. Cl.
*H04M 11/00* (2006.01)
(52) U.S. Cl. ................... 379/88.16; 348/14.12
(58) Field of Classification Search ............... 348/14.01, 348/14.12, 14.16, 14.07; 379/88.13, 88.16, 379/93.17
See application file for complete search history.

(56) References Cited

U.S. PATENT DOCUMENTS

| | | | |
|---|---|---|---|
| 2004/0203353 A1* | 10/2004 | Connor | 455/41.1 |
| 2004/0204194 A1* | 10/2004 | Akai et al. | 455/575.1 |
| 2007/0024700 A1* | 2/2007 | Lim et al. | 348/14.01 |
| 2010/0238041 A1* | 9/2010 | Acedo et al. | 340/686.6 |
| 2011/0043598 A1* | 2/2011 | Tokumitsu | 348/14.08 |
| 2011/0316966 A1* | 12/2011 | Lee et al. | 348/14.16 |

FOREIGN PATENT DOCUMENTS

| | | |
|---|---|---|
| KR | 10-2005-0027800 | 3/2005 |
| KR | 10-2006-0004517 | 1/2006 |
| KR | 10-2007-0025167 | 3/2007 |
| KR | 10-2007-0034327 | 3/2007 |

* cited by examiner

*Primary Examiner* — Olisa Anwah (57) ABSTRACT

A method and apparatus controls an output level of a voice signal for video telephony by considering the distance between a user and a terminal and surrounding noises. An input image signal and an input voice signal of the user to be used for the video telephony are received at the user's terminal. A received image signal and a received voice signal received from the other party's terminal to which the video telephony is connected, are output on the user's terminal. The user's face region included in the input image signal is extracted. A size information of the extracted face region is checked. A distance information about a distance from the user is checked using the size information. And an output level of the received voice signal is controlled based on the distance information.

20 Claims, 7 Drawing Sheets

METHOD AND APPARATUS FOR CONTROLLING OUTPUT LEVEL OF VOICE SIGNAL DURING VIDEO TELEPHONY

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Jun. 5, 2009 and assigned Serial No. 10-2009-0050011, the entire disclosure of which is hereby incorporated by reference.

TECHNICAL FIELD OF THE INVENTION

The present invention relates generally to a terminal capable of video telephony, and more particularly, to a method and apparatus for adjusting the volume of a terminal.

BACKGROUND OF THE INVENTION

With the development of various electronic and communication industries, portable wireless communication terminals have been widespread, and functions of the terminals have been diversified to meet the needs of users. On the other hand, the current trend of the terminals is toward compactness.

In software, aside from the simple call function, various functions have been added to allow users to download and listen to music files, download Video-On-Demand (VOD) files to watch videos, and take pictures of subjects to store them in a photo album or the like.

In hardware, peripheral devices also have been developed that are attached or added to the terminals. For example, the peripheral devices may include, for example, a digital camera device that is constructed in an attachable or built-in type, a Digital Multimedia Broadcasting (DMB) device with which the users can watch public broadcasting, and an ear microphone device that is mounted on the terminal to enable calls. The camera has recently been used for video telephony.

In video telephony, when a user talks with the other party on the phone, the sender's video is compressed and transmitted by a sending terminal. In a receiving terminal, the compressed other party's video is restored to the original video and displayed on the display. Likewise, the recipient's video is also compressed and transmitted to the sending terminal, and the sending terminal restores the compressed recipient's video to the original video and displays the restored video on the display.

While the video telephony system proposed up to now generally provides a function of allowing a user to talk to the other party on the phone in a face-to-face manner, it may be difficult for the system to provide the video telephony service by actively reflecting characteristics of the wireless communication environment, speed limits of the wireless communication, environmental factors for the video telephony, and such. In particular, unlike the voice call that is performed with the user's mouth placed close to a microphone of a sending terminal and the user's ear placed close to a speaker of the sending terminal, the video telephony or video call should be performed with the user's face placed apart from a camera mounted in the terminal by a predetermined distance or longer. Accordingly, during the video telephony, the surrounding noises are likely transmitted and received, and the noises, if significant, may prevent smooth calls.

SUMMARY OF THE INVENTION

To address the above-discussed deficiencies of the prior art, it is a primary object to provide at least the advantages described below. Accordingly, an aspect of the present invention provides a method and apparatus for automatically controlling an output level of a received voice by considering the distance between a user and a terminal and the surrounding noises.

In accordance with one aspect of the present invention, there is provided a method for controlling an output of a voice signal for video telephony, in which an input image signal and an input voice signal to be used for the video telephony are received. A received image signal and a received voice signal received from the other party's terminal to which the video telephony is connected are output. A user's face region included in the input image signal is extracted. Size information of the extracted face region is checked. Distance information about a distance from the user is checked using the size information. And an output level of the received voice signal is controlled based on the distance information.

In accordance with one aspect of the present invention, there is provided an apparatus for controlling an output of a voice signal for video telephony. The apparatus includes an image signal preprocessor that processes an input image signal to be used for the video telephony and a received image signal received from the other party's terminal A voice signal processor processes an input voice signal to be used for the video telephony and a received voice signal received from the other party's terminal. A face region checker checks a size of a user's face region included in the input image signal. And a voice signal output level controller controls an output level of the received voice signal based on a distance from the user, which is based on the size of the face region.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication terminal capable of video telephony. Exemplary embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Figure 1:
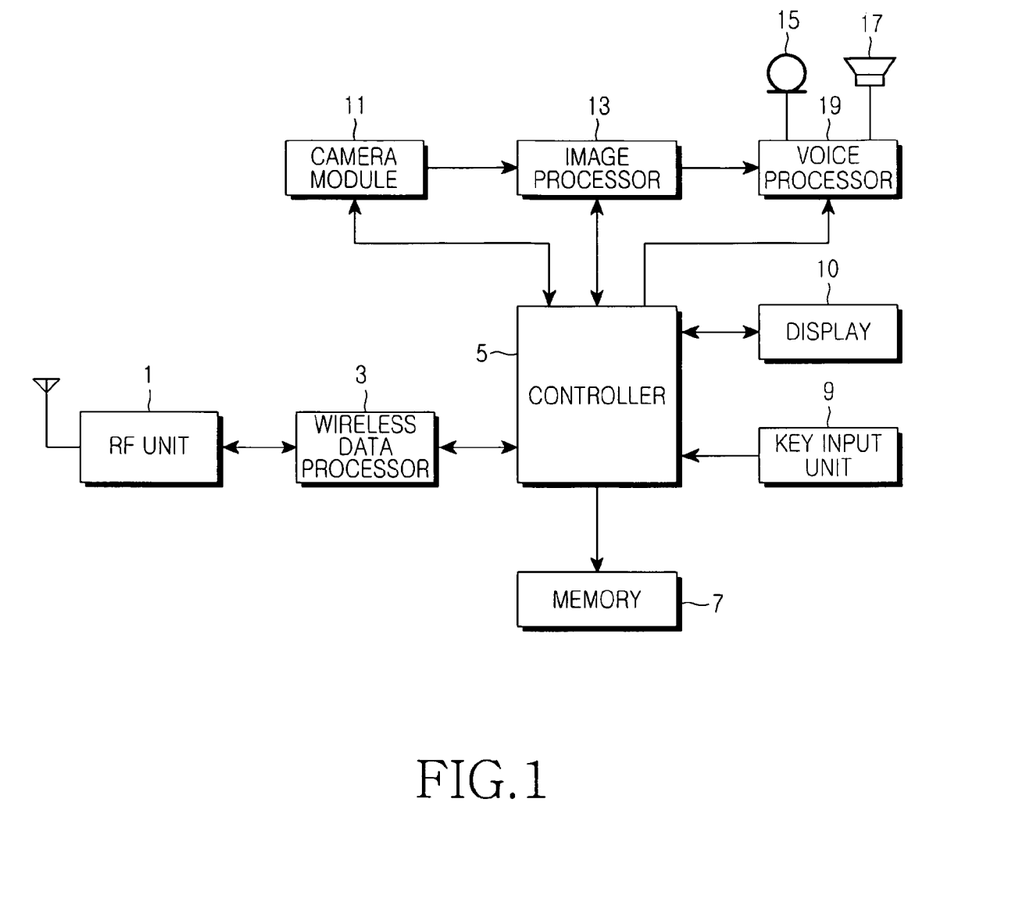
FIG. 1 illustrates a mobile communication terminal to which the present invention is applied.

FIG. 1 illustrates a mobile communication terminal to which the present invention is applied. In the following description of the present invention, among various devices capable of performing video telephony or video call, a mobile communication terminal capable of video telephony will be given as an example of a hardware-based device to which the present invention is applicable.

Referring to FIG. 1, the mobile communication terminal includes a Radio Frequency (RF) unit 1, a wireless data processor 3, a controller 5, a memory 7, a key input unit 9, a display 10, a camera module 11, an image processor 13, a microphone 15, a speaker 17, and a voice processor 19.

The RF unit 1 modulates a user's voice signal, image signal, texts, and control data into a radio signal, and transmit the radio signal to a base station (not shown) of a mobile communication network. The RF unit 1 also demodulates a radio signal received from the base station into voices, images, texts and control data. The wireless data processor 3, under the control of the controller 5, detects a received image signal and a received voice signal received from the RF unit 1, and provides them to the image processor 13 and the voice processor 19, respectively. The wireless data processor 3 also converts an input image signal and an input voice signal from the image processor 13 and the voice processor 19 into image data and voice data, respectively, and outputs them to the RF unit 1. In addition, the wireless data processor 3 provides the texts and control data being input through the RF unit 1, to the controller 5.

The camera module 11, under the control of the controller 5, generates an image signal about a subject by performing the general digital camera function, and provides the image signal to the image processor 13. The image processor 13 processes the image data output from the camera module 11 and converts it into digital image data in an appropriate format.

The key input unit 9, a device for receiving phone numbers or texts input by the user, includes keys for inputting numeric and character information, and function keys for setting various functions, and sends associated input signals to the controller 5. The display 10 may consist of a display device such as a Liquid Crystal Display (LCD), and under the control of the controller 5, displays captured digital image data including messages regarding various operation status of the terminal.

The controller 5 controls the overall operation of the mobile communication terminal by controlling operations of the respective functional units as a whole. That is, the controller 5 performs a process associated with the number and menu select signal being input through the key input unit 9, receives an externally captured image from the camera module 11, and performs a process associated with the received image. The controller 5 outputs an image output signal for various operations, including camera-captured images, using the display 10.

Upon receiving a request to perform a video telephony function, the controller 5 controls operations of the camera module 11, the image processor 13, the microphone 15, and the voice processor 19, to transmit the input image signal and input voice signal to be used for the video telephony, to the other party's terminal, and to output the received image signal and received voice signal received from the other party's terminal to the display 10 and the speaker 17, respectively. In the process of performing the video telephony, the controller 5 controls an output level of the received voice signal using the information provided from the image processor 13 and the voice processor 19.

If necessary, the controller 5 fetches desired output information stored in the memory 7, or stores the information in the memory 7. The memory 7 stores multiple programs and data associated with the operation of the controller 5, and particularly, stores an application program and associated information for performing video telephony in the controller 5 and controlling an output level of the received voice signal in the process of performing the video telephony. In addition, the memory 7 stores a variety of information that is used by the mobile communication terminal.

The mobile communication terminal with the above structure performs the common mobile communication service-related operations, including a function of controlling an output level of video telephony and received voice signal. In particular, the mobile communication terminal controls an output level of the received voice signal based on a size of a face region provided from the image processor 13 during the video telephony, according to the features of the present invention. The method of controlling an output level of a received voice signal according to the present invention, and the structure and operation of the mobile communication terminal to which the above method is applied, will be described in more detail with reference to the accompanying drawings.

Figure 2:
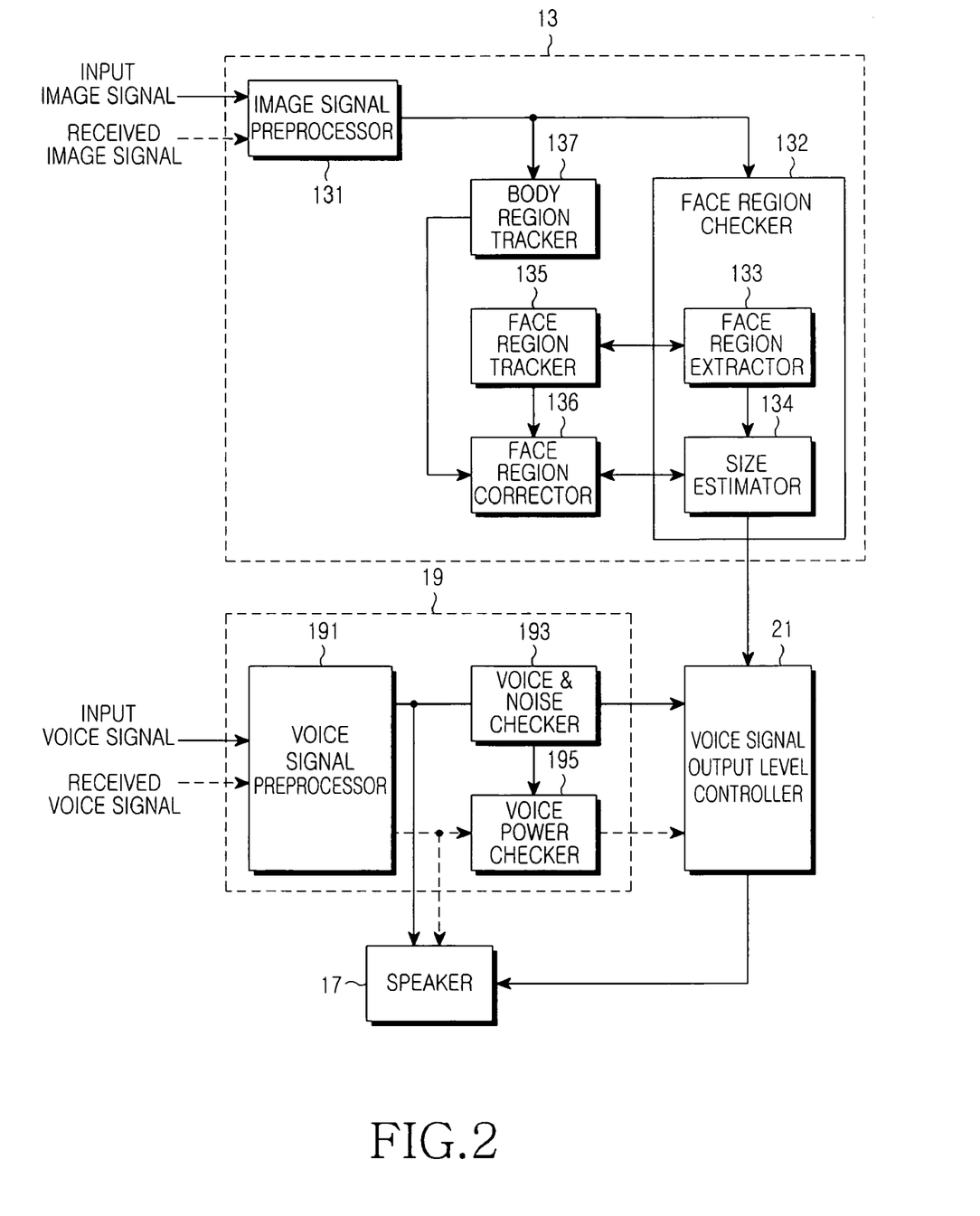
FIG. 2 illustrates detailed structures of some functional units of a mobile communication terminal to which a method according to an embodiment of the present invention is applied.

FIG. 2 illustrates detailed structures of some functional units of a mobile communication terminal to which a method according to an embodiment of the present invention is applied.

A mobile communication terminal, to which a method for controlling an output level of a received voice signal according to the present invention is applied, includes the image processor 13, the voice processor 19, and a voice signal output level controller 21.

The image processor 13 performs preprocessing such as a quality improvement algorithm, on an input image signal (e.g., image frame) being input for video telephony, detects a user's face region included in the input image signal, and provides a size of the detected face region to the voice signal output level controller 21.

The voice processor 19 performs preprocessing to detect noises included in an input voice signal being input for video telephony, checks a power level of a received voice signal received from the other party's terminal connected for the video telephony, and provides the power level to the voice signal output level controller 21.

Upon receiving the face region's size of the input image signal and the power level of the received voice signal from the image processor 13 and the voice processor 19, the voice signal output level controller 21 estimates a distance between the mobile communication terminal and its user based on the face region's size of the input image signal. The voice signal output level controller 21 determines an output level of the received voice signal by considering the estimated distance, and controls its output value.

The image processor 13 may include an image signal preprocessor 131 for preprocessing an input image signal and a received image signal, and a face region checker 132 for checking a face region included in the preprocessed input image signal.

The face region checker 132 may include a face region extractor 133 for extracting a user's face region from the input image signal, and a size estimator 134 for estimating a size of the extracted face region.

The face region extractor 133 may extract the user's face region from the input image signal using a pattern matching algorithm like AdaBoost, Neural Networks, Support Vector Machines, Principle Component Analysis, and such.

Meanwhile, the user's face region detected by the face region extractor 133 may reflect an approximate size of the face, but the size may appear different according to the user's properties or the user's use environments. Hence, the size estimator 134 takes measures to detect a consistent size of the face region by reducing errors about the size of the face region, which depend on the user's properties or the user's environment. To this end, the size estimator 134 provided in the present invention detects eye regions and a mouth region included in the face region, and normalizes the face region using a distance between the detected eye regions, and a distance between the eye regions and the mouth region, thereby consistently estimating the size of the face region. The size estimator 134 may detect the eye regions and the mouth region using a pattern matching algorithm used to extract the face region, such as AdaBoost, Neural Networks, Support Vector Machines, Principle Component Analysis, and such.

Figure 3A:
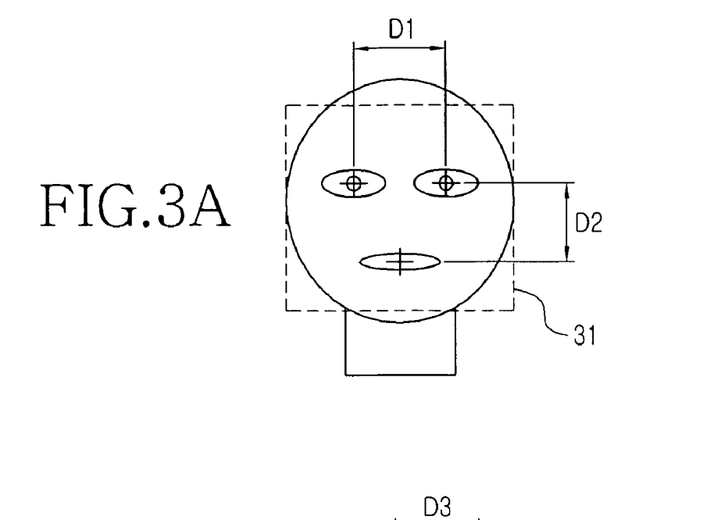
FIG. 3A illustrates an example of a face region being input from a camera placed in the front direction of the user's face.
Figure 3B:
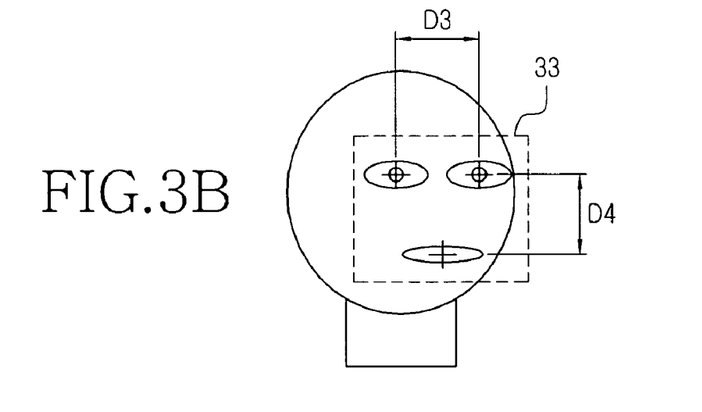
FIG. 3B illustrates an example of a face region being input from a camera placed in the side direction of the user's face.
Figure 3C:
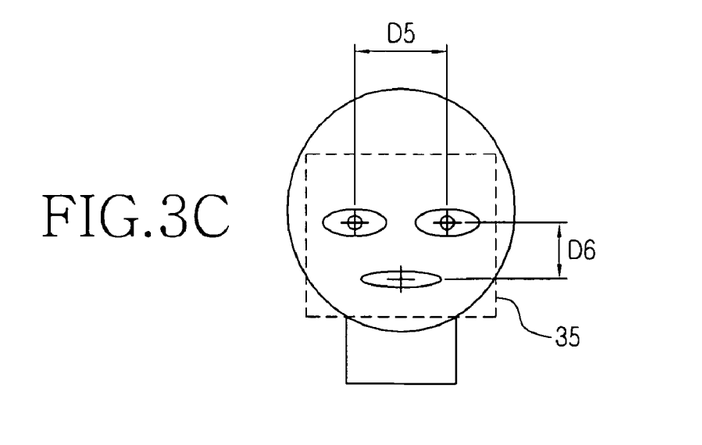
FIG. 3C illustrates an example of a face region being input from a camera placed in the upper direction of the user's face.

FIGS. 3A to 3C illustrate distance relationships between the eye regions and the mouth region depending on the photography angles and/or the directions of the user's face. FIG. 3A shows an example of a face region being input from a camera facing in the front direction of the user's face. FIG. 3B shows an example of a face region being input from a camera facing in the side direction of the user's face. FIG. 3C shows an example of a face region being input from a camera facing in the upper direction of the user's face.

If the camera is facing in the front direction of the user's face, a face region 31 may be estimated using a distance D1 between the eye regions and a distance D2 between the eye regions and the mouth region as shown in FIG. 3A. If the camera is facing in the side direction of the user's face, a distance D3 between the eye regions is detected shorter than the distance D1 in FIG. 3A and a distance D4 between the eye regions and the mouth region is detected equal to the distance D2 in FIG. 3A, as shown in FIG. 3B. Thus, a user's face region 33 may be estimated smaller than the face region 31 in FIG. 3A. If the camera is facing in the upper direction of the user's face, a distance D5 between the eye regions is detected to be the same as the distance D1 in FIG. 3A, and a distance D6 between the eye regions and the mouth region is detected shorter than the distance D2 in FIG. 3A, as shown in FIG. 3C. Accordingly, a user's face region 35 may be estimated smaller than the face region 31 in FIG. 3A.

Eventually, despite the constant distance between the mobile communication terminal and the user, errors may occur in estimating the size of the face region, depending on the photography angle between the user and (the camera taking a picture of the user) the mobile communication terminal, and/or the direction of the user's face. To reduce the errors, the mobile communication terminal, to which the method according to an embodiment of the present invention is applied, may further include a face region tracker 135 and a face region corrector 136. The face region tracker 135, which is sequentially provided with the face region from the face region extractor 133, tracks a change in location of the face region by analyzing a correlation between a first face region included in the input image signal that was input previously, and a second face region included in the input image signal that is input presently. The face region corrector 136 corrects a detection error between the first face region and the second face region, corrects the temporarily changed detection location, and provides the corrected detection location to the size estimator 134. For example, if the correlation (hereinafter referred to as a 'first correlation') between the first face region and the second face region appears to be greater than or equal to a predetermined threshold (hereinafter referred to as a 'first threshold'), the face region corrector 136 corrects the size and location of the second face region according to the size and location of the first face region. On the other hand, if the first correlation appears to be less than the first threshold, the face region corrector 136 maintains the location and size of the second face region without correcting the second face region.

The mobile communication terminal, to which the method according to an embodiment of the present invention is applied, may further include a body region tracker 137 to further reduce the error occurrence.

The body region tracker 137 extracts the user's body region from the input image signal provided from the image signal preprocessor 131, using a pattern matching algorithm like AdaBoost, Neural Networks, Support Vector Machines, Principle Component Analysis, and such. The body region tracker 137 tracks a change in location of the body region by analyzing a correlation between a first body region included in the input image signal that was input previously, and a second body region included in the input image signal that is input presently.

If the correlation (hereinafter referred to as a 'second correlation') between the first body region and the second body region appears to be greater than or equal to a predetermined threshold (hereinafter referred to as a 'second threshold'), the body region tracker 137 determines that both the body region and the face region have been changed, and provides the results to the face region corrector 136. In response, the face region corrector 136 determines the first correlation and compares the first correlation with the first threshold as described above. And then, the face region corrector 136 provides the corrected face region or the uncorrected face region to the size estimator 134 optionally according to the compared result. Alternatively, if the second correlation appears to be less than the second threshold, the body region tracker 137 determines that there is almost no movement of the body region and only the direction of the face region has been changed, and provides the results to the face region corrector 136. The face region corrector 136 maintains the location and size of the face region included in the current input image without correction, and provides the results to the size estimator 134.

Figure 4A:
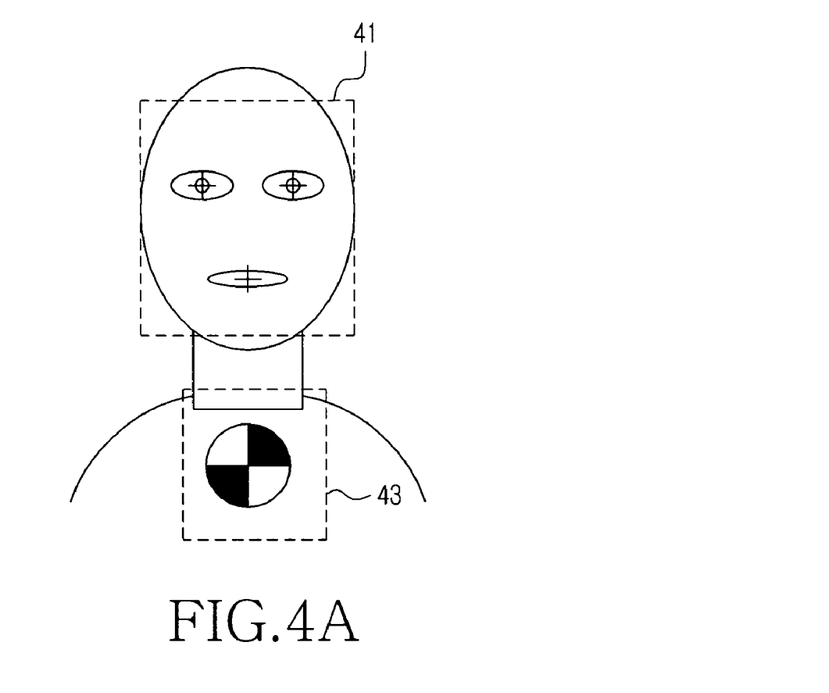
FIG. 4A illustrates an example of an image picture by a previous input image signal.
Figure 4B:
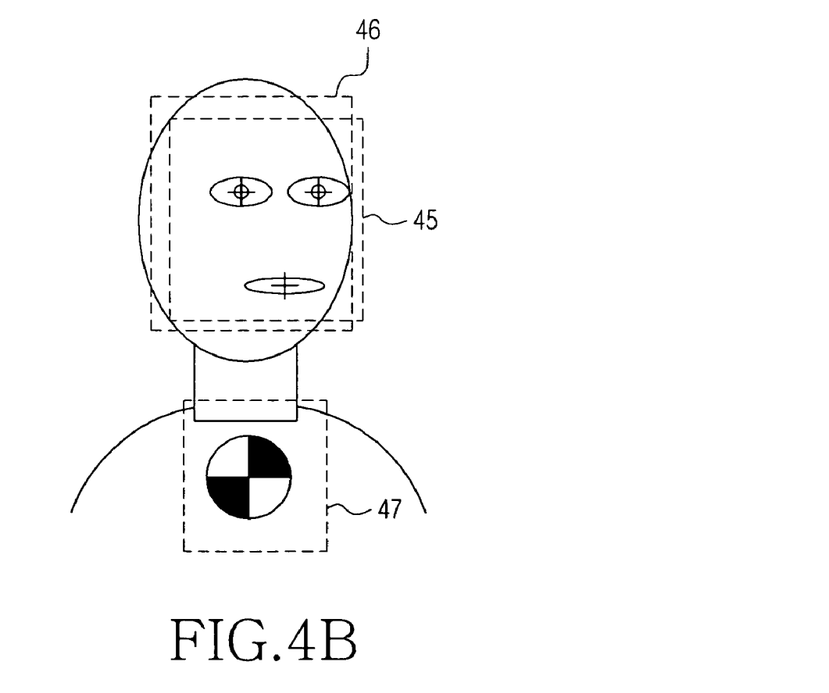
FIG. 4B illustrates an example of an image picture by a current input image signal.

FIG. 4A shows an example of an image picture by a previous input image signal, and FIG. 4B shows an example of an image picture by a current input image signal. Operations of the face region tracker 135, the body region tracker 137, and the face region corrector 136 will now be described with reference to FIGS. 4A and 4B.

The face region tracker 135 is sequentially provided with the face region from the face region extractor 133, analyzes a correlation between a first face region 41, included in the input image signal (FIG. 4A) that was input previously, and a second face region 45, included in the input image signal (FIG. 4B) that is input currently. And then, the face region tracker 135 determines that the first correlation between the first face region 41 and the second face region 45 is greater than the first threshold and provides the determined result to the face region corrector 136. The body region tracker 137 tracks a change in location of the body region by analyzing a correlation between a first body region 43 included in the input image signal (FIG. 4A) that was input previously, and a second body region 47 included in the input image signal (FIG. 4B) that is input presently. Determining that the correlation (second correlation) between the first body region 43 and the second body region 47 is greater than a predetermined threshold (second threshold), the body region tracker 137 perceives that there is almost no movement of the body region, and provides the perceived results to the face region corrector 136. In response, the face region corrector 136 perceives that there is almost no movement of the body region and the face region 45 included in the current input image is similar to the face region 41 included in the previous input image, and corrects the location and size of the face region 45 included in the current input image according to the location and size of the face region 41 included in the previous input image, and provides the corrected face region 46 to the size extractor 134.

The face region corrector 136 may correct the face region included in the current input image through computation corresponding to Equation (1) below.

$$R_{compensated} = (1 - (\alpha_{vision} + \beta_{vision}) \times R_{face\_detection}) + \alpha_{vision} \times R_{face\_tracking} + \beta_{vision} \times R_{body\_tracking}$$ [Eqn. 1]

$R_{compensated}$ denotes the correction (or compensation) results by the face region corrector 136, $R_{face\_dection}$ denotes a motion vector of the face region extracted by the face region extractor 133, $R_{face\_tracking}$ denotes a motion vector of the face region tracked by the face region tracker 135, $R_{body\_tracking}$ denotes a motion vector of the body region tracked by the body region tracker 137, and each of $\alpha_{vision}$ and $\beta_{vision}$ denotes a ratio for compensation of the face's location.

While it has been described that the face region corrector 136 performs correction of the face region through the computation of Equation (1) in an embodiment of the present invention, the present invention should not be limited thereto. For example, the correction of the face region may be changed in various ways by changing the degree according to the compensation ratio or rate of the face region, or by using integral and differential operations.

Meanwhile, the voice signal output level controller 21 may control an output level of a received voice signal by checking only the distance between the mobile communication terminal and the user, but in the actual video telephony environments, the surrounding noises and the other party's voice power (or voice level) may affect the video telephony environments. Considering this, it is preferable that the voice signal output level controller 21 controls a power level of the received voice signal using a Signal-to-Noise Ratio (SNR) of the input voice signal and the power level of the received voice signal. Preferably, therefore, the voice processor 19 includes a voice signal preprocessor 191, a voice & noise checker 193, and a voice power checker 195. The voice signal preprocessor 191 performs preprocessing to detect and remove noises included in the input voice signal and the received voice signal. The voice & noise checker 193 checks noises included in the input voice signal, checks an SNR of the input voice signal, and provides it to the voice signal output level controller 21. The voice power checker 195 checks a power level of the received voice signal included in the preprocessed received voice signal and provides it to the voice signal output level controller 21.

In response, the voice signal output level controller 21 corrects the power level of the received voice signal using the SNR of the input voice signal and the power level of the received voice signal. For example, the voice signal output level controller 21 may correct the power level of the received voice signal through computation of Equation (2) below.

$$P_{compensated} = (1 - \alpha_{sound}) \times P_{SNR} + \alpha_{sound} \times P_{recv}$$ [Eqn. 2]

$P_{compensated}$ denotes the corrected (or compensated) power level of the received voice signal, $P_{SNR}$ denotes an SNR of the input voice signal, $P_{recv}$ denotes a power level of the received voice signal, and $\alpha_{sound}$ is a constant for adjusting a ratio of $P_{SNR}$ and $P_{recv}$.

The voice signal output level controller 21 may set an output level of the received voice signal based on the corrected face region $R_{compensated}$ included in the current image signal and the corrected power level $P_{compensated}$ of the received voice signal. For example, the voice signal output level controller 21 may optimize the output level of the received voice signal through computation of Equation (3) below.

$$V_{opt} = V_{base} \times \frac{R_{compensated}}{R_{base}} \times \frac{P_{compensated}}{P_{base}}$$ [Eqn. 3]

$V_{opt}$ denotes the received voice signal's output level optimized by the voice signal output level controller 21, $V_{base}$ denotes the voice signal's output level set by the user, $R_{compensated}$ denotes a size of the corrected face region included in the current image signal, $P_{compensated}$ denotes the corrected power level of the received voice signal, $R_{base}$ denotes a reference (or base) value associated with the face region's size, and $P_{base}$ denotes a reference value associated with the received voice signal's power.

While it has been described that the voice signal output level controller 21 outputs a value for controlling an output level of the received voice signal by performing computation of Equation (3) in an embodiment of the present invention, the present invention should not be limited thereto.

Figure 5:
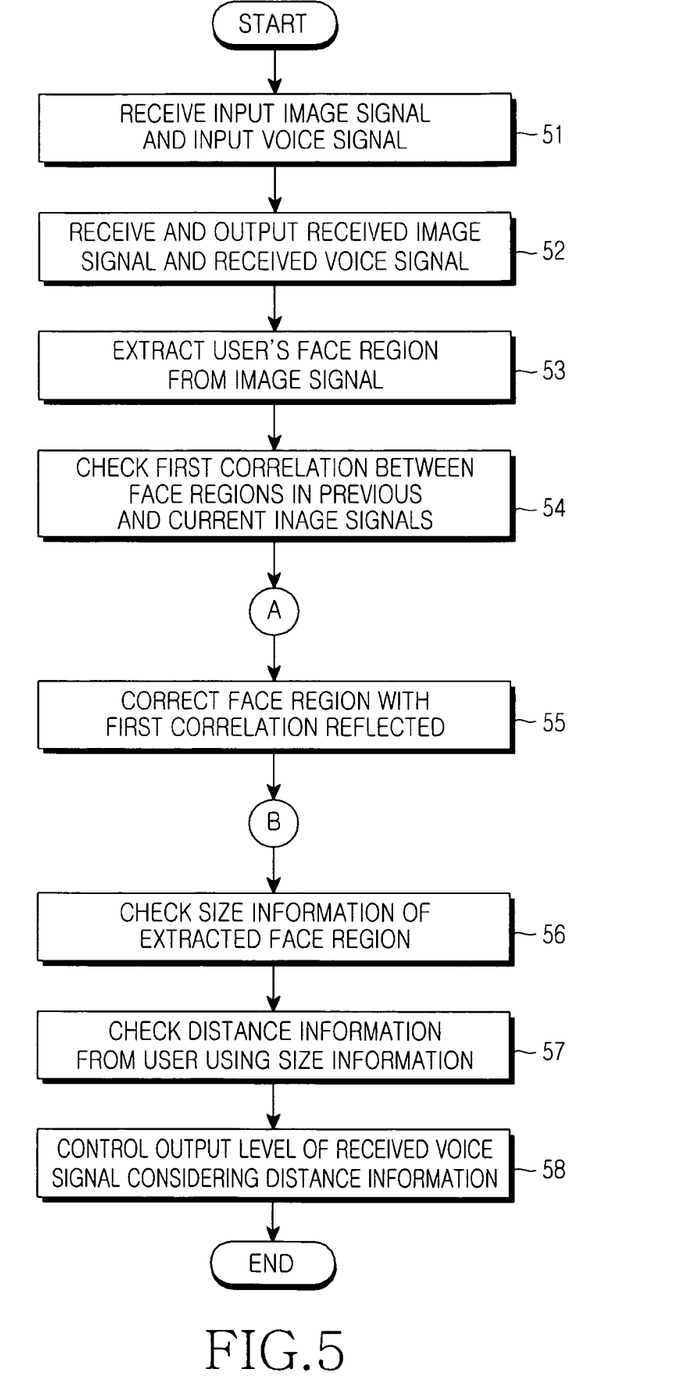
FIG. 5 illustrates a process for controlling an output level of a received voice signal according to an embodiment of the present invention.

FIG. 5 illustrates a process for controlling an output level of a received voice signal according to an embodiment of the present invention.

Referring to FIG. 5, in block 51, as a user enables the video telephony function of his mobile communication terminal (hereinafter referred to as a "first terminal"), the first terminal initiates operations of related devices, e.g., a camera module, a microphone, a speaker, and such, and receives an input image signal and an input voice signal by means of these devices, preparing for the video telephony.

In block 52, after completing the preparation for the video telephony, the first terminal connects a call for video telephony to the other party's mobile communication terminal (hereinafter referred to as a "second terminal") using a communication module (consisting of, for example, a radio signal processer, an RF unit, and an antenna), transmits the input image signal and the input voice signal to the second terminal, receives a received image signal and a received voice signal from the second terminal, and outputs the received image signal and the received voice signal to a display and a speaker of the first terminal, respectively.

In block 53, the first terminal extracts a face region included in the input image signal. Preferably, the face region in the input image signal may be extracted using a pattern matching algorithm such as AdaBoost, Neural Networks, Support Vector Machines, Principle Component Analysis, and such.

In block 56, the first terminal checks size information including information about a size of the face region extracted in block 53. In block 57, the first terminal estimates a distance between the mobile communication terminal and its user based on the size of the face region in the input image signal. In block 58, the first terminal determines an output level of the received voice signal based on the estimated distance, and controls the output value.

Meanwhile, the detected user's face region may reflect an approximate size of the face, but the size may appear different depending on the user's properties and/or the user's environments. Hence, measures are taken to reduce errors on the size of the face region, which depend on the user's properties or the user's environments, and to detect a consistent size of the face region.

Figure 6:
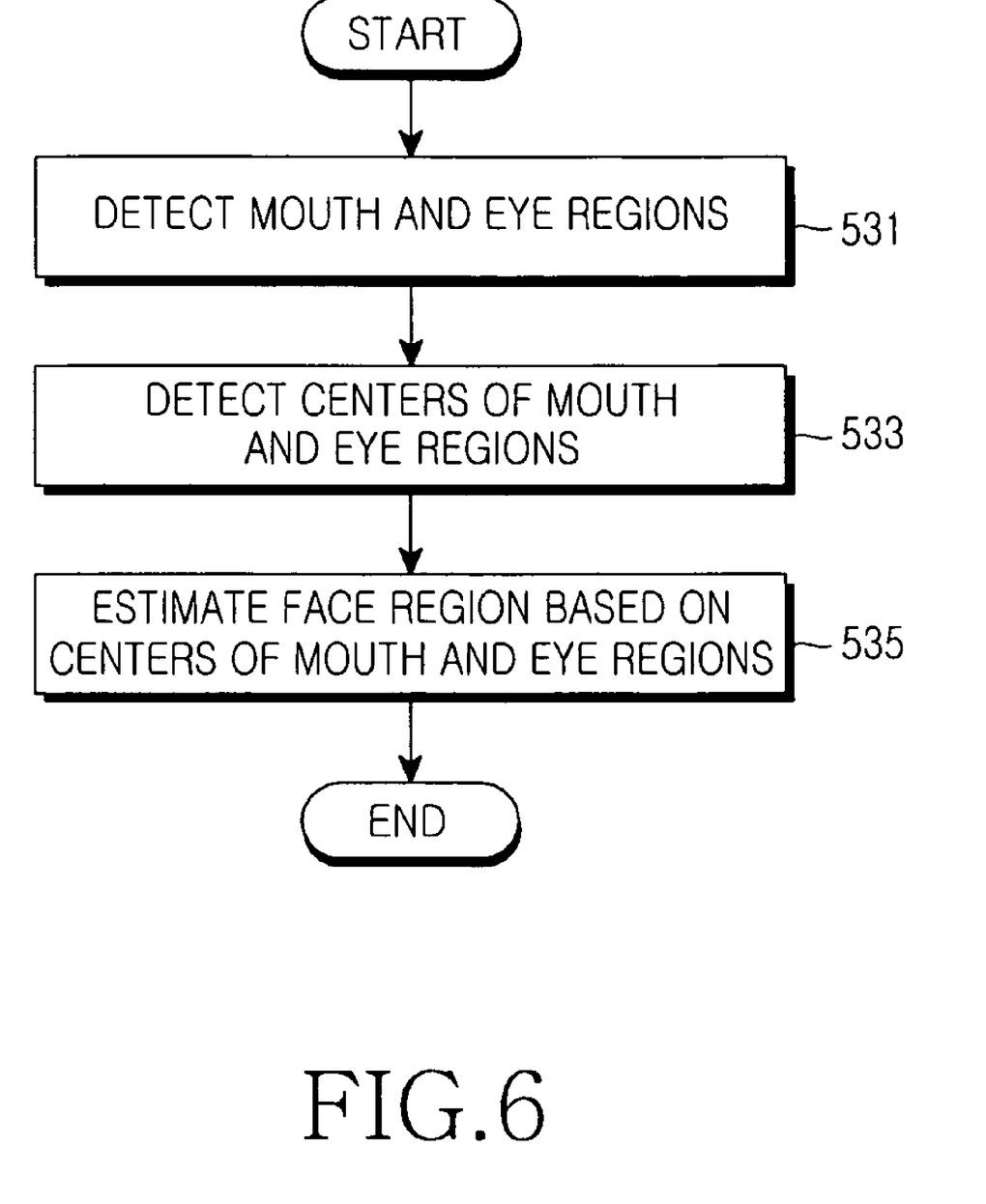
FIG. 6 illustrates a process of detecting a face region in the method according to an embodiment of the present invention.

FIG. 6 shows a process of detecting a face region in the method according to an embodiment of the present invention.

Referring to FIG. 6, the process of detecting a face region in the method according to an embodiment of the present invention includes detecting eye regions and a mouth region in block 531, detecting centers of the eye regions and mouth region detected in block 533, and estimating a normalized face region using a distance between the eye regions and a distance between the eye regions and the mouth region, which are based on the detected centers in block 535. The eye regions and the mouth region may be detected using a pattern matching algorithm used to extract the face region, such as AdaBoost, Neural Networks, Support Vector Machines, Principle Component Analysis, and such.

Despite the constant distance between the mobile communication terminal and the user, errors may occur in estimating the size of the face region, depending on the photography angle between the user and (the camera taking a picture of the user) the mobile communication terminal, and/or the direction of the user's face. To reduce the errors, it is preferable that the method according to an embodiment of the present invention further includes blocks 54 and 55.

In block 54, using the input image signals that have been sequentially input, the first terminal analyzes a correlation (hereinafter referred to as a 'first correlation') between a first face region detected from the input image signal that was input previously, and a second face region detected from the input image signal that is input presently. In block 55, the first terminal corrects a detection error between the first face region and the second face region, and corrects the temporarily changed detection location. For example, if the first correlation appears to be greater than or equal to a predetermined threshold (hereinafter referred to as a 'first threshold'), the first terminal corrects the size and location of the second face region according to the size and location of the first face region. Alternatively, if the first correlation appears to be less than the first threshold, the first terminal maintains the location and size of the second face region without correcting the second face region.

In the method according to an embodiment of the present invention, measures to detect body regions and correct the face region based on a correlation between the body regions may be adopted as an alternative to the method of using only the first threshold, in order to reduce the above errors.

Figure 7:
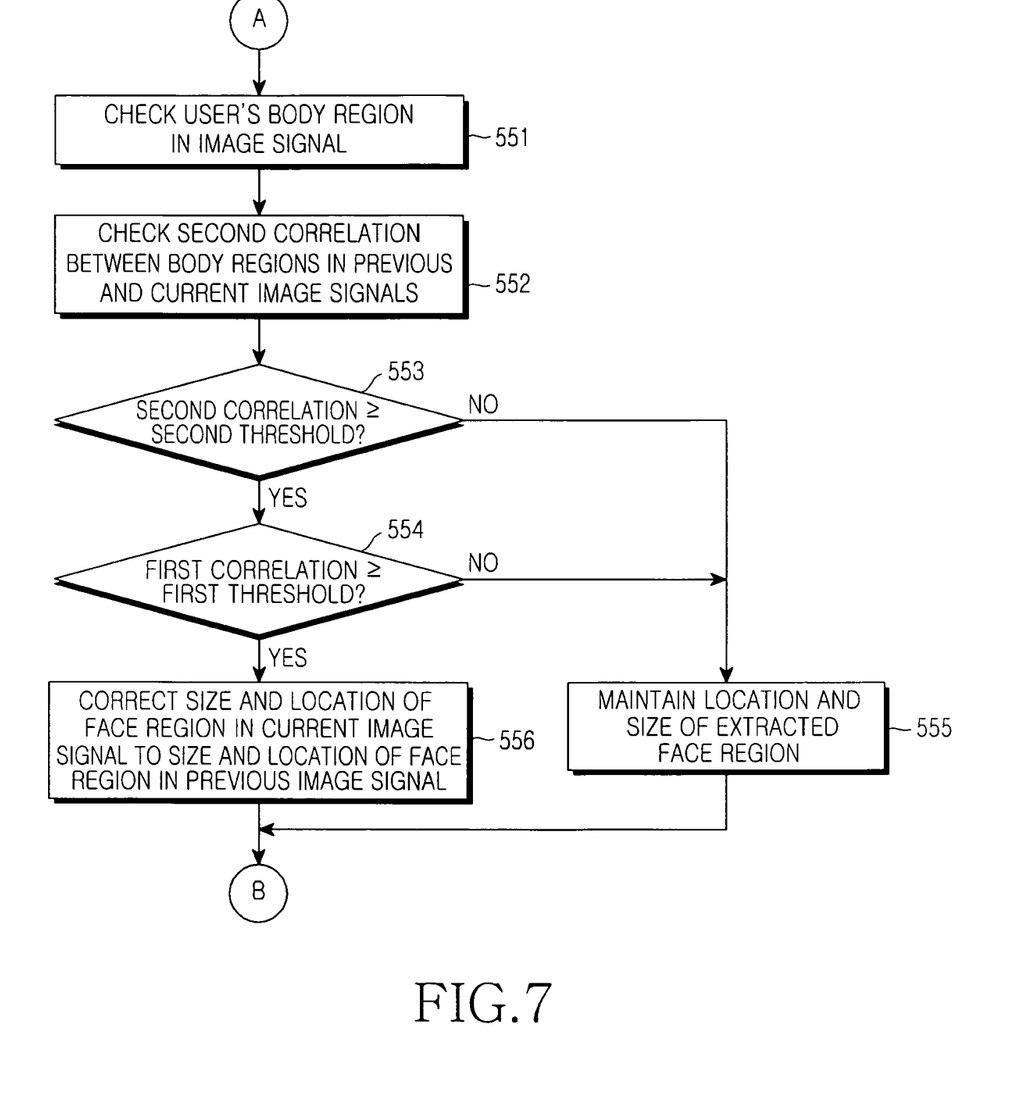
FIG. 7 illustrates a process of correcting a face region in the method according to an embodiment of the present invention.

FIG. 7 shows a process of correcting a face region in the method according to an embodiment of the present invention.

In block 551, the first terminal extracts the user's body region from an input image signal. Similar to the method of extracting the face region, the body region may be extracted using a pattern matching algorithm such as AdaBoost, Neural Networks, Support Vector Machines, Principle Component Analysis, and such.

In block 552, the first terminal checks a correlation (hereinafter referred to as a 'second correlation') between a first body region included in the input image signal that was input previously, and a second body region included in the input image signal that is input presently.

If the second correlation appears to be greater than or equal to a predetermined threshold (hereinafter referred to as a 'second threshold') in block 553, the first terminal proceeds to block 554. If the second correlation appears to be less than the second threshold, the first terminal proceeds to block 555.

If the first correlation appears to be greater than or equal to the first threshold in block 554, the first terminal proceeds to block 556. If the first correlation appears to be less than the first threshold, the first terminal proceeds to block 555.

In block 555, the first terminal maintains the location and size of the face region in the current input image without correction, determining that the body region and the face region included in the current input image signal are significantly different from those in the previous input image signal.

In block 556, the first terminal corrects the location and size of the face region in the current input image according to the location and size of the face region in the previous input image, determining that there is almost no movement of the body region and only the direction of the face region has been changed.

The correction in block 556 can be performed through computation corresponding to Equation (1).

Meanwhile, it is possible to control an output level of the received voice signal by checking only the distance between the mobile communication terminal and its user, but in the actual video telephony environments, the surrounding noises and the other party's voice power may affect the video telephony environments. Considering this, it is preferable to control a power level of the received voice signal using an SNR of the input voice signal and the power level of the received voice signal. Therefore, in block 58, it is preferable to control the power level of the received voice signal by factoring in the SNR of the input voice signal and the power level of the received voice signal, using the computation corresponding to Equation (2). Further, in block 58, it is more preferable to set an output level of the received voice signal by considering the face region $R_{compensated}$ in the current image signal and the power level $P_{compensated}$ of the received voice signal, which have been corrected through the computation corresponding to Equation (3).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling an output of a voice signal for video telephony in a first terminal, comprising:
    receiving an input image signal and an input voice signal to be used for the video telephony;
    outputting a received image signal and a received voice signal received from a second terminal to which the video telephony is connected;
    extracting a user's face region included in the input image signal;
    measuring a size information of a currently extracted face region;
    determining a distance information about a distance between the user and the first terminal based on the size information; and
    controlling an output level of the received voice signal based on the distance information.

2. The method of claim 1, wherein the output level of the received voice signal is further controlled based on a Signal-to-Noise Ratio (SNR) of the input voice signal and a power level of the received voice signal.

3. The method of claim 1, wherein extracting the user's face region comprises:
    detecting eye regions and a mouth region of the user from the input image signal;
    detecting a center of each of the eye regions and mouth region; and
    extracting the face region based on the centers of the eye regions and mouth region.

4. The method of claim 1, further comprising:
    checking a first correlation between a previously extracted face region and the currently extracted face region; and
    correcting the face region depending on the first correlation.

5. The method of claim 4, further comprising:
    detecting a body region in the input image signal;
    checking a second correlation between a previously detected body region and a currently detected body region; and
    correcting the face region depending on the second correlation.

6. The method of claim 5, wherein if the second correlation is greater than or equal to a predetermined threshold, a previous location and a previous size of the previously extracted face region is applied to a current location and a current size of the currently extracted face region for correction of the currently extracted face region, and determining that the input image signals that have been input at different times are similar to each other.

7. The method of claim 6, wherein the currently extracted face region is corrected by applying a predetermined weight in the current location of the currently extracted face region, a motion vector of a tracked face region, and a motion vector of a tracked body region.

8. An apparatus for controlling an output of a voice signal for video telephony, comprising:
    an image signal preprocessor configured to process an input image signal from a user to be used for the video telephony and a received image signal received from another user's terminal;
    a voice signal processor configured to process an input voice signal from the user to be used for the video telephony and a received voice signal received from the other user's terminal;
    a face region checker configured to check a size of the user's face region included in the input image signal; and
    a voice signal output level controller configured to control an output level of the received voice signal based on a distance from the user, which is based on the size of the user's face region.

9. The apparatus of claim 8, wherein the voice signal processor is further configured to check a Signal-to-Noise Ratio (SNR) of the input voice signal and a power level of the received voice signal, and wherein the voice signal output level controller is further configured to control the output level of the received voice signal by also considering the SNR of the input voice signal and the power level of the received voice signal.

10. The apparatus of claim 8, wherein the face region checker comprises:
    a face region extractor configured to detect eye regions and a mouth region of the user from the input image signal, and estimating the face region based on centers of the eye regions and the mouth region; and
    a size estimator configured to estimate a size of the face region.

11. The apparatus of claim 8, further comprising:
    a face region tracker configured to track movement of the face region by checking a first correlation between face regions estimated from input image signals that have been input at different times; and
    a face region corrector configured to correct the face region by reflecting the correlation between the face regions.

12. The apparatus of claim 11, further comprising a body region tracker configured to detect a body region included in the input image signal and tracking movement of the body region by checking a second correlation between body regions included in input image signals that have been input at different times,
    wherein the face region corrector is further configured to correct the face region depending on the first correlation between face regions and the second correlation between body regions.

13. The apparatus of claim 12, wherein if the correlation between body regions is greater than or equal to a predetermined threshold, the face region corrector is further configured to apply a previous location and a previous size of a face region in a previous frame to a current location and a current size of a face region in a current frame for correction of the face region, determining that the input image signals that have been input at different times are similar to each other.

14. The apparatus of claim 12, wherein the face region corrector is further configured to correct the face region by applying a predetermined weight in the current location of the face region in the current input image signal, a motion vector of the tracked face region, and a motion vector of the tracked body region.

15. The apparatus of claim 12, wherein the voice signal output level controller is further configured to:
- determine a distance from the user based on the size information of the face region, and
- control an output level of the received voice signal based on a power level of the received voice signal, an SNR of the input voice signal, and the distance from the user.

16. A method for controlling an output volume at a first terminal, the method comprising:
- receiving an input image signal and an input voice signal from a user of the first terminal, the input image signal comprising a face region of the user;
- determining a distance between the first terminal and the user based on a size of the face region of the user;
- processing a received voice signal received from a second terminal; and
- controlling an output level of the received voice signal based on the distance.

17. The method of claim 16, wherein determining the distance comprises:
- extracting a current face region of the user;
- determining whether a first correlation between a previously extracted face region and the currently extracted face region is greater than a first threshold;
- correcting the face region in response to determining that the first correlation is greater than the first threshold; and
- calculating the distance based on a size of the corrected face region.

18. The method of claim 17, wherein determining the distance further comprises:
- detecting a current body region of the user in the image signal;
- determining whether a second correlation between a previously detected body region of the user and the currently detected body region is greater than a second threshold,
- wherein the face region is corrected in response to the first correlation being greater than the first threshold and the second correlation being greater than the second threshold.

19. The method of claim 16, wherein the output level of the received voice is further controlled based on a Signal-to-Noise Ratio (SNR) of the input voice signal and a power level of the received voice signal.

20. The method of claim 16, wherein correcting the face region is based on a motion vector of the currently extracted face region, a motion vector of the face region tracked by a face region tracker, a motion vector of the currently detected body region, and a predetermined weight in a current location of the extracted face region.

* * * * *